(12) United States Patent
Mitchell et al.

(10) Patent No.: US 12,006,979 B2
(45) Date of Patent: Jun. 11, 2024

(54) BEARING SEAT ASSEMBLY

(71) Applicant: Aktiebolaget SKF, Gothenburg (SE)

(72) Inventors: Erik Mitchell, Hovås (SE); Zongkang Xu, Suzhou (CN); Weiguang Cao, Changshu (CN); Weifei Geng, Shanghai (CN)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/536,262

(22) Filed: Nov. 29, 2021

(65) Prior Publication Data
US 2022/0221005 A1   Jul. 14, 2022

(30) Foreign Application Priority Data

Jan. 8, 2021   (CN) .......................... 202110026014.0

(51) Int. Cl.
*F16C 33/78* (2006.01)
*F16C 13/02* (2006.01)
*F16C 33/76* (2006.01)
*F16C 37/00* (2006.01)

(52) U.S. Cl.
CPC .......... *F16C 33/7823* (2013.01); *F16C 13/02* (2013.01); *F16C 33/768* (2013.01); *F16C 33/783* (2013.01); *F16C 33/7886* (2013.01); *F16C 33/7896* (2013.01); *F16C 37/007* (2013.01)

(58) Field of Classification Search
CPC .... F16C 13/02; F16C 33/768; F16C 33/7823; F16C 33/783; F16C 33/7886; F16C 33/7896; F16C 33/805; F16C 37/007
See application file for complete search history.

(56) References Cited

U.S. PATENT DOCUMENTS

| | | | |
|---|---|---|---|
| 4,015,883 A * | 4/1977 | Taylor ................. | F16C 33/7876 277/573 |
| 4,692,040 A * | 9/1987 | Ebaugh .................. | B21B 31/07 384/477 |

(Continued)

FOREIGN PATENT DOCUMENTS

| | | | | |
|---|---|---|---|---|
| CN | 1155633 A | * | 7/1997 | ........... B21B 31/078 |
| CN | 109723823 A | * | 5/2019 | .............. F16B 11/00 |

(Continued)

OTHER PUBLICATIONS

Machine Translation of JP-2005331002-A (Year: 2005).*

(Continued)

*Primary Examiner* — Alan B Waits
(74) *Attorney, Agent, or Firm* — GARCIA-ZAMOR INTELLECTUAL PROPERTY LAW, LLC; Ruy Garcia-Zamor

(57) ABSTRACT

A bearing seat assembly for a roller assembly includes a bearing seat; a bearing, arranged inside the bearing seat; a first seal, including at least two sealing lips. The first seal is installed on the bearing seat and is arranged on a first axial outer side of the bearing. At least one sealing lip of the at least two sealing lips of the first seal is arranged around the inner or outer circumference of the first seal. The bearing seat assembly according to the present disclosure realizes enhanced sealing, avoids re-lubrication, improves thermal performance, and prolongs service life.

18 Claims, 3 Drawing Sheets

(56) References Cited

U.S. PATENT DOCUMENTS

| | | | | |
|---|---|---|---|---|
| 5,649,772 | A | * | 7/1997 | Schlereth .............. F16C 33/785 |
| | | | | 277/572 |
| 5,915,843 | A | * | 6/1999 | Mattera ................. F16C 37/007 |
| | | | | 384/321 |
| 2002/0012485 | A1 | * | 1/2002 | Zauner ...................... F16C 9/02 |
| | | | | 384/484 |
| 2013/0129270 | A1 | * | 5/2013 | Takahashi ............. F16C 33/586 |
| | | | | 384/476 |
| 2016/0215824 | A1 | * | 7/2016 | Gezault ................. F16J 15/064 |
| 2016/0229470 | A1 | * | 8/2016 | Suzuki ................. F16C 43/045 |

FOREIGN PATENT DOCUMENTS

| | | | | |
|---|---|---|---|---|
| DE | 10202525 | A1 | 7/2003 | |
| DE | 102016224761 | A1 | 6/2017 | |
| EP | 1205694 | A2 | 5/2002 | |
| FR | 2604498 | A1 | 4/1988 | |
| JP | S54112765 | A | 9/1979 | |
| JP | S5973063 | U | 5/1984 | |
| JP | H05231422 | A | 9/1993 | |
| JP | 2003220454 | A | 8/2003 | |
| JP | 2005331002 | A * | 12/2005 | ............ F16C 33/783 |
| JP | 2007177860 | A | 7/2007 | |
| JP | 2009113056 | A | 5/2009 | |
| JP | 2009287710 | A * | 12/2009 | .......... F16C 33/7853 |

OTHER PUBLICATIONS

Machine Translation of CN-1155633-A (Year: 1997).*
Machine Translation of JP-2009287710-A (Year: 2009).*
Machine Translation of CN-109723823-A (Year: 2019).*

* cited by examiner

BEARING SEAT ASSEMBLY

CROSS-REFERENCE TO RELATED APPLICATIONS

This application claims priority to Chinese Patent Application no. 202110026014.0, filed Jan. 8, 2021, the contents of which is fully incorporated herein by reference.

TECHNICAL FIELD

The present disclosure relates to a bearing seat assembly.

BACKGROUND

Bearing seat assemblies can be used for various roller shaft assemblies. The modern continuous casting machine (CCM), especially for continuous bloom casting, is suffering from roll line short service life (online time), one of the major problem showing on the bearing housing unit, where the bearing could not well perform its expected life due to harsh operation environment surrounding the bearing. The typical problems are:

1) Conventional roll lines use open design bearing with relubrication (grease pumping) from a center lubrication system; in this case, there are the pumping function problems sometimes occurred, or the grease is torched/burned by excessive heat from the slab/boom, causing the bearing runs without sufficient grease and sees premature failure.

2) Typical housing seals (besides the bearings) in the conventional roll line are single lip seals with springs, which have been regarded as with ordinary sealing performance. The inside spaces of the bearings often encounter water and solid contamination ingression, causing premature failure.

3) Housings in conventional roll line, particularly for bloom casters, due to the limited available space, are typically designed simply with a rectangle shape for top surface, which will absorb more heat radiation from the bloom/slab. Also, due to the limited space, the cooling channel in the housing is designed simply as a drilling hole, limiting the heat exchange area and resulting in relatively low cooling efficiency, as shown in FIG. 5.

SUMMARY

In view of this, the present disclosure provides a bearing seat assembly for a roller assembly, which comprises a bearing seat; a bearing, arranged inside the bearing seat; a first seal, including at least two sealing lips; wherein, the first seal is installed on the bearing seat and arranged on a first axial outer side of the bearing, and wherein at least one sealing lip of the at least two sealing lips of the first seal is arranged around the inner or outer circumference of the first seal.

According to the present disclosure, the interior of the bearing seat assembly is effectively isolated from the external environment, so that a good working environment can be provided for the bearing in the bearing seat assembly, and the long service life of the bearing can be ensured. The strong sealing function of the present disclosure not only eliminates the lubrication channel for conveying lubricant in the conventional bearing seat, but also can ensure that there is no need to re-lubricate the interior of the bearing seat assembly during the service life of the bearing and the seal, thus eliminating the risk of problems (such as lubrication system problems, lubricant burning or stuck in pipes, etc.) caused by the failure to timely or sufficiently supply the lubricant to the bearing and the seal.

According to the present disclosure, the structure of the bearing seat is improved, a curved top part is provided, and a cooling channel is arranged in the top part to obtain better thermal performance, have higher resistance to higher temperature and thermal radiation from the external environment, prolong the sealing life, improve the cooling, and further improve the service life of the whole bearing seat assembly. The present disclosure aims at the combined improvement of sealing, cooling and lubrication, and comprehensively improves the performance and service life of the bearing seat assembly as a whole.

Although the present disclosure has designed the bearing seat assembly with the above-mentioned structure and advantages especially for the continuous casting machine, it should be understood that the bearing seat assembly of the present disclosure can be applied to various other roller/shaft assemblies as required.

EMBODIMENTS

Figure 1:
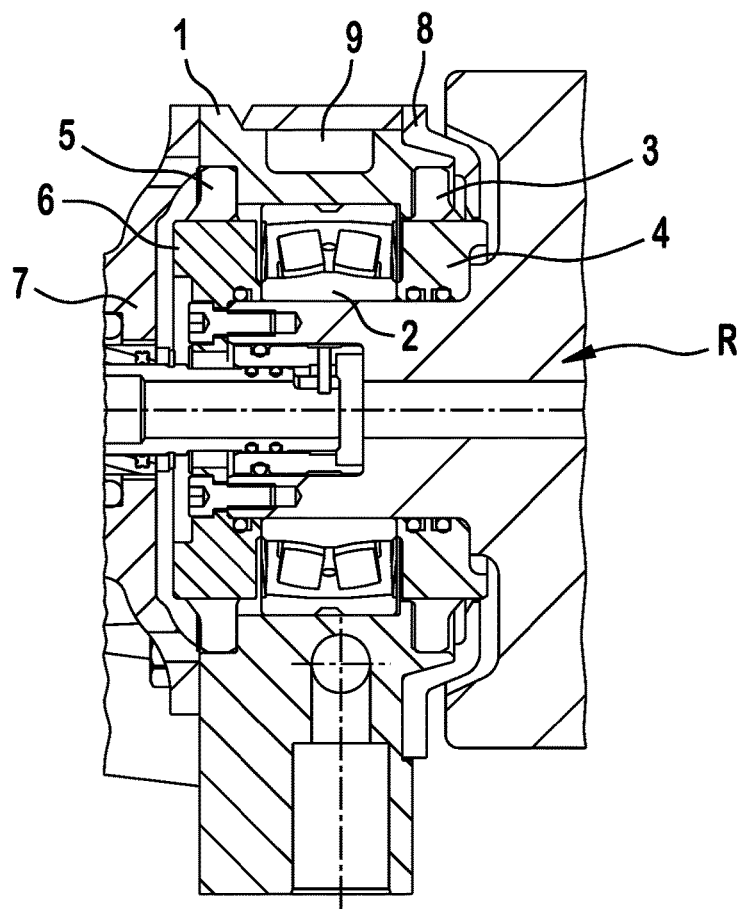
FIG. 1 is a sectional view showing a bearing seat assembly according to a preferred embodiment of the present disclosure.

In the following description, the term "axial direction" refers to the axial direction of the roller assembly carried by a bearing, which can also be referred as the axial direction around which the bearing rotates. The term "radial direction" refers to the diameter direction of the inner and outer rings of the bearing perpendicular to the axial direction. The term "circumferential direction" refers to the circumferential direction of the bearing, which is also the direction of rotation of the bearing. The terms "inner", "inside" refer to the side facing the interior of the bearing in the axial or radial direction. The terms "outer", "outside" refer to the side facing the exterior of the bearing in the axial or radial direction. In addition, the term "roller assembly" includes assemblies with the components being able to rotate, such as rotating roller assemblies and rotating shaft assemblies. In the following description, the same reference numerals refer to the same or similar structures or components.

Figure 2:
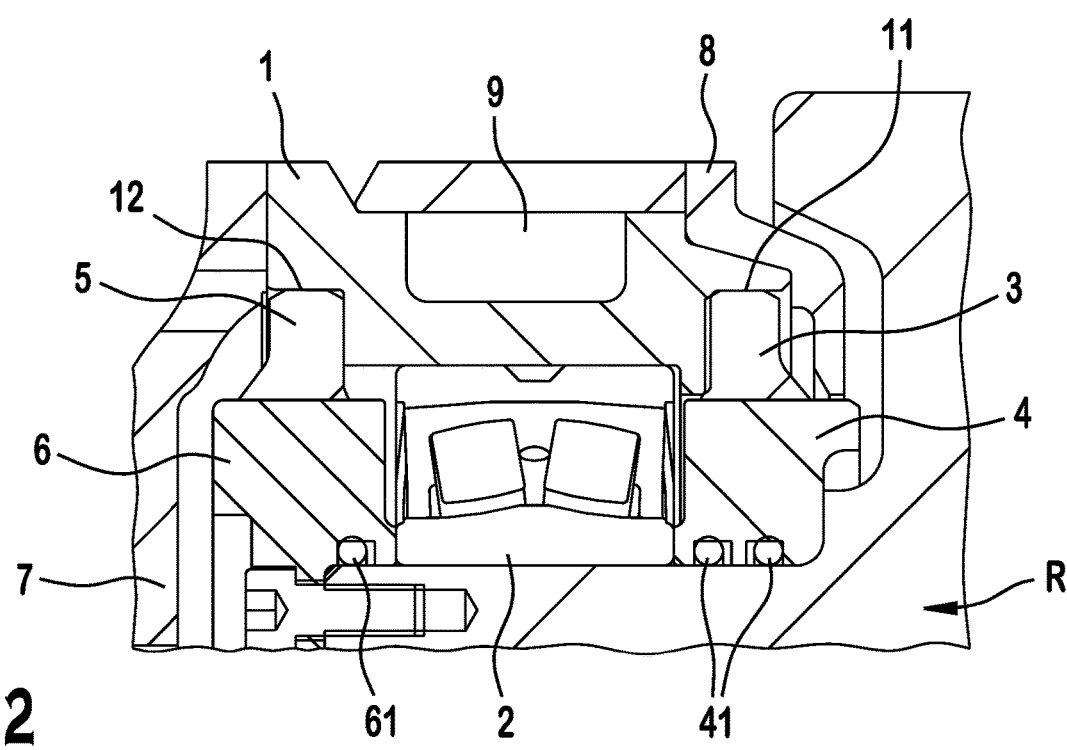
FIG. 2 is an enlarged sectional view showing a bearing seat assembly according to a preferred embodiment of the present disclosure.

Referring to FIGS. 1-2, the present disclosure provides a bearing seat assembly for a roller assembly R, which comprises: a bearing seat 1; a bearing 2, which is arranged in the bearing seat 1; a first seal 3, which is preferably annular, and includes at least two sealing lips 31 (in the preferred embodiment shown in FIG. 3, the number of sealing lips 31 is three), that is, the first seal is a multi-lip seal. The first seal 3 is installed on the bearing seat 1 and is arranged on the first axial outer side of the bearing 2 (i.e., on the right side with respect to the bearing 2 in the figures).

Figure 3:
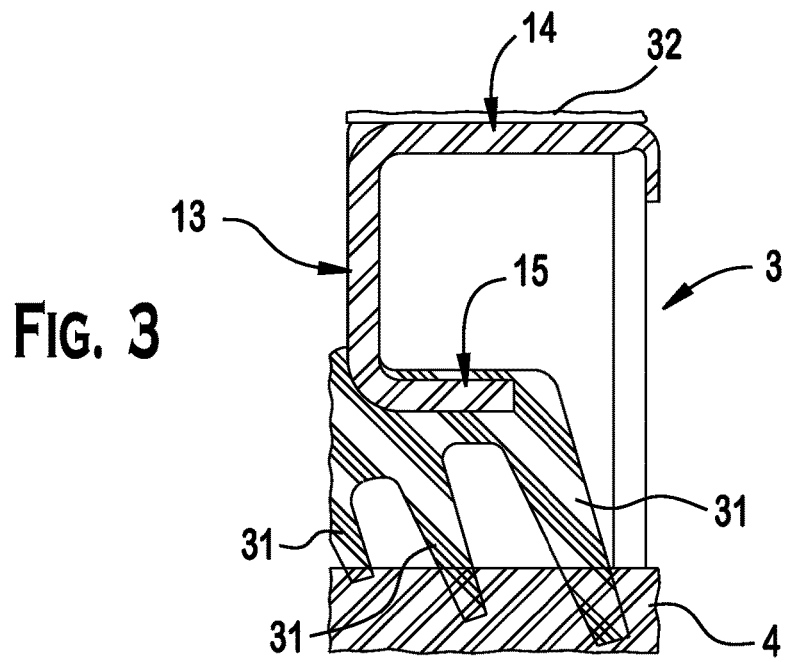
FIG. 3 is an enlarged view showing the free state of the first seal in the bearing seat assembly according to a preferred embodiment of the present disclosure.
Figure 4:
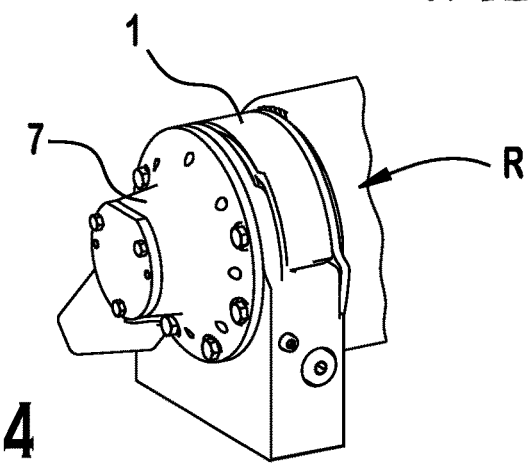
FIG. 4 is an external view showing the bearing seat assembly according to a preferred embodiment of the present disclosure.

In the preferred embodiment shown in FIGS. 1-3, a first sealing sleeve 4 is arranged between the sealing lips 31 of the first seal 3 and the roller assembly to further strengthen the structure. It should be noted that FIG. 3 shows the assembly relationship between the sealing lips 31 and the first sealing sleeve 4 in a free state. After an actual installation, the sealing lips 31 will be pressed and deformed, so as to tightly abut against the first sealing sleeve 4 instead of entering into the first sealing sleeve 4.

Further preferably, at least one sealing ring 41 can be arranged on the inner circumference of the first sealing sleeve 4, so that the sealing ring 41 can contact the roller assembly R to achieve sealing. As shown in FIG. 2, for the first sealing sleeve 4, it is preferable to provide two sealing rings 41, which are static sealing members, such as O-rings.

In addition, according to a preferred embodiment not shown, the first sealing sleeve 4 can also be omitted, and the sealing lips 31 of the first seal 3 can directly contact the roller assembly R, thereby reducing the number of components and simplifying the installation.

Further preferably, the bearing 2 is a sealed bearing instead of an open bearing in the prior art.

Due to the above arrangement, compared with the prior art, the bearing seat has no channel for introducing the lubricant, that is, the bearing seat assembly avoids re-lubrication. Specifically, the interior of the bearing seat assembly contains lubricant injected at one time, which is sufficient to lubricate the sealed bearings and seals etc. during the service life of the bearings and seals, so that there is no need to re-lubricate the bearing seat assembly during the service life of the bearings and seals.

It should be understood that, although in FIG. 3 the first seal 3 includes three sealing lips arranged on the inner circumference of the first seal 3, in other preferred embodiments, at least one of at least two sealing lips of the first seal is arranged on the inner circumference of the first seal, so as to directly contact the roller assembly R (such as contact the journal, the roller body and other related structures in the roller assembly) as described above, or a first sealing sleeve 4 is arranged between said at least one sealing lip of said at least two sealing lips and the roller assembly. Additionally, the first seal 3 may have a base 13 with a radially outer axially extending portion 14 and a radially inner axially extending portion 15. The material forming the at least two sealing lips 31 may also surround the radially inner axially extending portion 15. The elastic material 32 may extend along a radially outer edge of the radially outer, axially extending portion 14 and separate the base 13 from the recess or stepped portion 11.

Furthermore, in addition to the at least one sealing lip one the inner circumference of the first seal, the first seal may also include one or more sealing lips (not shown) located on its outer circumference and/or side face(s) (one side face or both side faces), the sealing lips on the outer circumference of the first seal may abut against the bearing seat 1 (for example, abut against the recess or stepped portion 11 described below), while the sealing lips on the side face(s) may abut against the related components or structures of the roller assembly R and the bearing 2, so as to achieve sealing in multiple dimensions.

Further preferably, the bearing seat 1 may include a recess or stepped portion 11 for receiving the first seal 3. The recess or stepped portion 11 is formed in the form of a hole around the circumferential direction and can be integrally formed with the bearing seat 1, so as to achieve a good heat dissipation effect, that is, the heat can be transferred out more quickly and taken away by the fluid in the cooling channel 9 described later. Alternatively, according to a preferred embodiment not shown, the bearing seat may include a mounting piece for mounting the first seal, and the mounting piece may be connected to the bearing seat in various suitable ways.

Further preferably, an elastic material 32 with a thickness of at least 0.03 mm can be arranged on the outer circumference of the first seal 3, as shown in FIG. 3, so that the elastic material 32 can be pressed within the recess or stepped portion 11 of the bearing seat 1 by its elastic deformation, so as to achieve tight and good sealing. Furthermore, by arranging the elastic material 32 in this way, when the inner diameter of the recess or stepped portion 11 for accommodating the first seal 3 is enlarged due to the working conditions, the first seal 3 can still be tightly abutted against within the recess or stepped portion 11 by the elastic deformation of the elastic material 32, thereby ensuring the sealing effect.

Further preferably, the bearing seat assembly may further include a second seal 5 similar to the first seal 1. The second seal 5 includes at least two sealing lips (not shown) and is installed on the bearing seat 1 and arranged on the second axial outer side of the bearing 2 (i.e., on the left side with respect to the bearing 2 in the figures). As shown in FIG. 1-2, the first axial outer side is the side close to the roller assembly R, and the second axial outer side is the side away from the roller assembly R. Similar to the first seal 3, at least one of the at least two sealing lips of the second seal 5 may directly contact the roller assembly R, or a second sealing sleeve 6 may be provided between the at least one sealing lip of the at least two sealing lips of the second seal 5 and the roller assembly R.

Although not shown, it should be understood that the form of the sealing lips of the second seal 5 may be similar to that of the sealing lips 31 of the first seal 3 shown in FIG. 3.

Further preferably, at least one sealing ring 61 can be arranged on the inner circumference of the second sealing sleeve 6 (as shown in FIG. 2, one sealing ring 61 is provided). In addition, according to a preferred embodiment not shown, the second sealing sleeve 6 can be omitted, and the sealing lips of the second seal 5 can directly contact the roller assembly R, thereby reducing the number of components and simplifying the installation.

Further, according to different preferred embodiments, in addition to at least one sealing lip on the inner circumference of the second seal, the second seal may also include one or more sealing lips on its outer circumference and/or side face(s) (one side face or both side faces), the sealing lips on the outer circumference may abut against the bearing seat 1, and the sealing lips on the side face(s) may abut against the related components or structures of the roller assembly R and the bearing 2, so as to achieve sealing in multiple dimensions.

Further preferably, the bearing seat 1 may include a recess or stepped portion 12 for receiving the second seal 5. The recess or stepped portion 12 is formed in the form of a hole around the circumferential direction and can be integrally formed with the bearing seat 1. Alternatively, according to a preferred embodiment not shown, the bearing seat may include a mounting piece for mounting the second seal, and the mounting piece may be connected to the bearing seat in various suitable ways. Further preferably, an elastic material with a thickness of at least 0.03 mm can also be arranged on the outer circumference of the second seal 5, so as to ensure its sealing effect.

Preferably, the first seal 3 and the second seal 5 can contain materials with elastic properties such as HNBR (hydrogenated nitrile rubber), FKM (fluororubber), NBR (nitrile rubber), etc., and are preferably manufactured in the form of sealing rings. Preferably, the first sealing sleeve 4 and the second sealing sleeve 6 can be directly made of stainless steel, or the steel commonly used in the market can also be directly used, and furthermore, the radially outer surfaces of the first sealing sleeve 4 and the second sealing sleeve 6 can also be coated with a plating layer or a surfacing welding layer or a thin metal coating layer applied in any way, so that the surfaces of the sealing sleeves are more wear-resistant or corrosion-resistant.

It should be understood that although the embodiment of FIGS. 1-2 shows that the bearing seat assembly includes the second seal 5 and its related structure, the second seal 5 and its related structure can be replaced or omitted, that is, on the side away from the roller assembly R (the left side in the figure), a traditional single lip seal or a non-contact seal can replace the second seal 5, or the bearing seat assembly can be enclosed only by an end cover 7 without any second seal.

Further preferably, the bearing seat assembly further includes a shield 8, which is located between the first seal 3 and the roller assembly R in the axial direction. The shield is preferably made of metal material. The shield 8 can preferably be integrally formed with the bearing seat or a separate component to contact the bearing seat 1 and/or the first seal 3, and its functions are: 1) heat insulation, to reduce heat radiation from the outside; 2) pollution reduction, such as to reduce the intrusion of solid, liquid and gaseous external pollutants into bearing seat assembly.

Further preferably, at least one part of the top of the bearing seat 1 is formed in a curved shape, and a cooling channel 9 is formed in said at least one part. The cooling channel 9 is preferably formed by machining/milling or direct casting. Further preferably, the width of the at least one part of the cooling channel 9 is at least half of the width of the bearing 2, so as to cool along a larger bearing width in the axial direction.

Other modified embodiments (not shown) of the bearing seat assembly according to the present disclosure will be described below. For example, at least one sealing lip of the at least two sealing lips of the first seal can be arranged on the outer circumference of the first seal, and at this time, the at least one sealing lip directly contacts the bearing seat assembly, or a sealing sleeve can be arranged between the at least one sealing lip and the bearing seat assembly (the thickness of the sealing sleeve can be thin to adapt to cooperate with the bearing seat assembly). For this modified embodiment, the inner circumference of the first seal may also include one or more sealing lips, or an elastic material with a thickness of at least 0.03 mm as described above, so that the sealing lips or the elastic material on the inner circumference may directly contact the roller assembly, or the first sealing sleeve 4 as described above may be arranged between the sealing lips or the elastic material on the inner circumference and the roller assembly.

It should be further understood, when the bearing seat assembly includes a second seal, the sealing lips on the second seal can be similarly arranged. That is, at least one sealing lip is included on the outer circumference of the second seal, which can directly contact the bearing seat assembly, or a sealing sleeve is arranged between the at least one sealing lip and the bearing seat assembly (the thickness of the sealing sleeve can be thin to adapt to cooperate with the bearing seat assembly). Furthermore, the inner circumference of the second seal may also include one or more sealing lips, or an elastic material with a thickness of at least 0.03 mm as described above, so that the sealing lips or elastic material on the inner circumference can directly contact the roller assembly, or the second sealing sleeve 6 as described above may be arranged between the sealing lips or elastic material on the inner circumference and the roller assembly.

The preferred embodiment of the bearing seat assembly according to the present disclosure and its variants are described above. Compared with the prior art, the technical solution of the present disclosure can achieve many advantages.

1. A Lubrication-Free Bearing Seat Assembly can be Achieved.

Because the sealed bearing is used in the bearing seat and at least the first seal is used (the second seal is also used in the preferred embodiment), and the lubrication channel (for example, formed by drilling) in the bearing seat of the prior art is eliminated, it is possible to inject high-quality lubricant into the bearing seat of the present disclosure at one time, so that the sealed bearing and seal(s) in the bearing seat do not need to be re-lubricated again during their service life. This eliminates the risk of premature failure of sealed bearings and seal(s) due to problems such as re-lubrication.

2. Improvement of the Sealing Function of Bearing Seat Assembly.

Water, steam, solid particles, etc. from the outside can be effectively isolated by using the sealed bearing, the first/second seal with multiple lips as described above, the first/second seal sleeve and its sealing ring, etc.

3. Improvement of Thermal Performance

Figure 5:
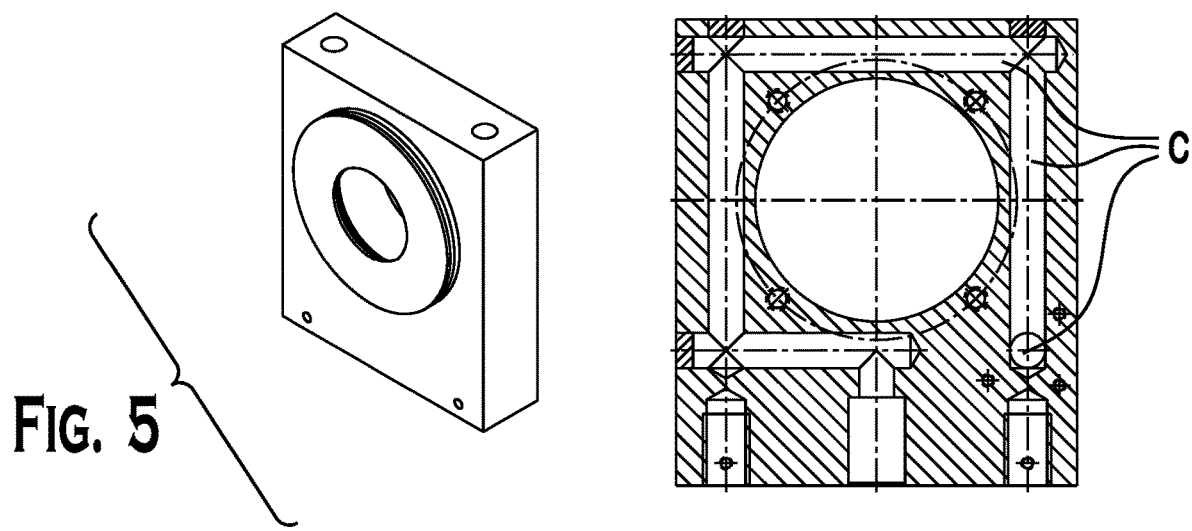
FIG. 5 is a perspective view and a section view showing a bearing seat assembly according to the prior art.
Figure 6:
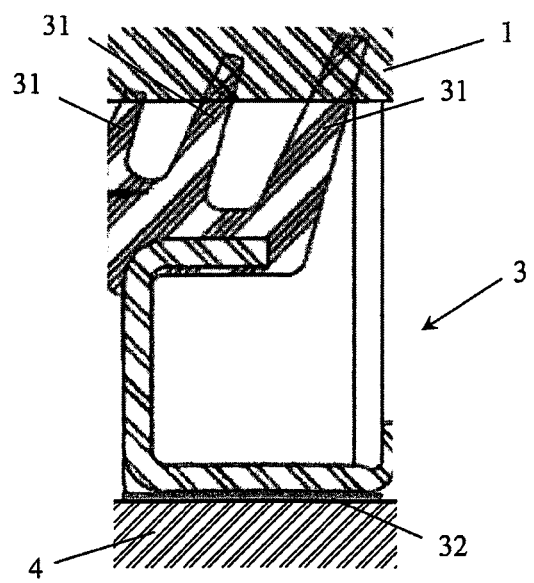
FIG. 6 is an enlarged view showing the free state of the first seal in the bearing seat assembly in an alternate embodiment in which the at least one sealing lip is arranged on the outer circumference of the first seal with the at least one sealing lip directly contacting the bearing seat.

Due to the curved shape of the top of the bearing seat of the present disclosure, less heat radiation is received from the bloom/slab compared with the rectangular top surface of the prior art (FIG. 5). Furthermore, the cooling channel 9 is formed inside the bearing seat as described above, and thus there is a larger heat exchange surface than the cooling channel C formed by drilling in the prior art (FIG. 5).

The exemplary implementation of the scheme proposed in this disclosure has been described in detail above with reference to the preferred embodiments. However, those skilled in the art can understand that without departing from the concept of this disclosure, many variations and modifications can be made to the above specific embodiments, and various technical features and structures proposed in this disclosure can be combined without exceeding the scope of protection of this disclosure, which is determined by the appended claims.

The invention claimed is:

1. A bearing seat assembly for a roller assembly, comprising:
a bearing seat;
a bearing, arranged inside the bearing seat;
a first seal, including at least two sealing lips, the first seal comprising a base having a radially inner, axially extending portion and a radially outer, axially extending portion, the radially inner, axially extending portion being surrounded by a material, the material forming the at least two sealing lips which extend radially inward, the radially outer, axially extending portion having an elastic material extending along a radially outer edge of the radially outer, axially extending portion, the elastic material being configured to be compressed against the bearing seat and expand to accommodate any variation in position of the bearing seat relative to the radially outer, axially extending portion, the radially inner, axially extending portion extending axially outward wherein, the first seal is installed on the bearing seat and arranged on a first axial outer side of the bearing, wherein at least one sealing lip of the at least two sealing lips of the first seal is arranged around the inner circumference of the first seal.

2. The bearing seat assembly according to claim 1, wherein when the at least one sealing lip is arranged on the inner circumference of the first seal, the at least one sealing lip directly contacts the roller assembly, or a first sealing sleeve is arranged between the at least one sealing lip and the roller assembly.

3. The bearing seat assembly according to claim 2, wherein at least one sealing ring is in contact with the roller assembly and is arranged on an inner circumference of the first sealing sleeve.

4. The bearing seat assembly of claim 1, wherein the at least one sealing lip of the at least two sealing lips of the first seal forms a radially innermost portion of the first seal.

5. The bearing seat assembly according to claim 1, wherein the elastic material has a thickness of at least 0.03 mm.

6. The bearing seat assembly of claim 1, wherein the bearing seat assembly is free of re-lubrication.

7. The bearing seat assembly according to claim 1, further comprising a second seal, which includes at least two sealing lips and is installed on the bearing seat and arranged on a second axial outer side of the bearing;

wherein, the first axial outer side is the side close to the roller assembly, and the second axial outer side is the side away from the roller assembly; and wherein at least one sealing lip of the at least two sealing lips of the second seal directly contacts the roller assembly, or a second sealing sleeve is arranged between at least one sealing lip of the at least two sealing lips of the second seal and the roller assembly.

8. The bearing seat assembly according to claim 1, wherein the bearing seat assembly further comprises a shield which is located between the first seal and the roller assembly in the axial direction.

9. The bearing seat assembly according to claim 1, wherein at least one part of the top of the bearing seat is formed in a curved shape, and a cooling channel is formed in the at least one part; and wherein the width of at least one part of the cooling channel is at least half of the width of the bearing.

10. The bearing seat assembly according to claim 1, wherein a first sealing sleeve is located on a radially inner side of the first seal such that the first seal is located between a bearing seat and the first sealing sleeve.

11. A bearing seat assembly for a roller assembly, comprising:

a bearing seat;

a bearing, arranged inside the bearing seat;

a first seal, including at least two sealing lips, the first seal comprising a base having a radially inner, axially extending portion and a radially outer, axially extending portion, the radially inner, axially extending portion being surrounded by a material, the material forming the at least two sealing lips which extend radially inward, the radially outer, axially extending portion having an elastic material extending along a radially outer edge of the radially outer, axially extending portion, the elastic material being configured to be compressed against the bearing seat and expand to accommodate any variation in position of the bearing seat relative to the radially outer, axially extending portion, wherein, the first seal is installed on the bearing seat and arranged on a first axial outer side of the bearing, wherein at least one sealing lip of the at least two sealing lips of the first seal is arranged around the inner circumference of the first seal, wherein when the at least one sealing lip is arranged on the inner circumference of the first seal, a first sealing sleeve is arranged between the at least one sealing lip and the roller assembly, the first sealing sleeve having a metal coating.

12. The bearing seat assembly according to claim 11, wherein the thin metal coating is made of stainless steel.

13. The bearing seat assembly of claim 11, wherein the at least one sealing lip of the at least two sealing lips of the first seal forms a radially innermost portion of the first seal.

14. The bearing seat assembly according to claim 11, wherein the elastic material has a thickness of at least 0.03 mm.

15. The bearing seat assembly according to claim 11, further comprising a second seal, which includes at least two sealing lips and is installed on the bearing seat and arranged on a second axial outer side of the bearing;

wherein, the first axial outer side is the side close to the roller assembly, and the second axial outer side is the side away from the roller assembly; and wherein at least one sealing lip of the at least two sealing lips of the second seal directly contacts the roller assembly, or a second sealing sleeve is arranged between at least one sealing lip of the at least two sealing lips of the second seal and the roller assembly.

16. The bearing seat assembly according to claim 11, wherein the bearing seat assembly further comprises a shield which is located between the first seal and the roller assembly in the axial direction.

17. The bearing seat assembly according to claim 11, wherein at least one sealing ring is in contact with the roller assembly and is arranged on an inner circumference of the first sealing sleeve.

18. The bearing seat assembly according to claim 11, wherein at least one part of the top of the bearing seat is formed in a curved shape, and a cooling channel is formed in the at least one part; and wherein the width of at least one part of the cooling channel is at least half of the width of the bearing.

* * * * *